Jan. 12, 1971  B. C. ALLITT  3,553,789

MOLDING APPARATUS

Filed Nov. 6, 1968  2 Sheets-Sheet 2

INVENTOR
BERNARD C. ALLIT

By Stevens, Davis, Miller & Mosher
ATTORNEYS

United States Patent Office 3,553,789
Patented Jan. 12, 1971

3,553,789
MOLDING APPARATUS
Bernard C. Allitt, Four Oaks, Sutton Coldfield, England, assignor to The Dunlop Company Limited, London, England, a British company
Filed Nov. 6, 1968, Ser. No. 773,779
Claims priority, application Great Britain, Nov. 18, 1967, 52,550/67
Int. Cl. B29h 17/00
U.S. Cl. 18—42        10 Claims

ABSTRACT OF THE DISCLOSURE

A pneumatic tire mold comprising a plurality of tread molding segments arranged between two mold halves, the segments being pivotally attached to one of the two halves and movable radially apart on opening the mold under the influence of spring members, one member for each segment. The spring members each comprise a plurality of co-axially arranged dished annuli compressible to tend to flatten the form of the annuli and to provide a comparatively large force, sufficient to break the adhesion between the tread rubber of the tire and the molding segments.

---

This invention relation to moulding apparatus, and more especially, to pneumatic tire moulds.

In the manufacture of pneumatic tires it is necessary to ensure that the very powerful adhesion of the rubber to the mould segments can be broken so that the segments can be moved clear of the moulded tire so as to enable the complex moulded tread pattern to be disengaged from the moulding matrix attached to the segments and the tire removed from the mould.

It is an object of the present invention to provide an improved form of apparatus which applies the comparatively high force necessary to break the said adhesion.

According to the invention there is provided a pneumatic tire mould comprising two mould halves in co-axial relationship each having sidewall- and bead-moulding portions, a plurality of tread moulding segments pivotally mounted on one of the mould halves so as to be disposed relatively to one another between the sidewall- and bead-moulding portions circumferentially of the mould in the form of an annulus and spring members operatively engageable one with each of the segments to move the segments substantially radially apart, each of said spring members comprising a plurality of co-axially arranged dished annuli compressible to tend to flatten the form of the annuli and to provide a spring force sufficient to break the adhesion of the tire tread rubber with the moulding segment.

Preferably each spring member comprises two elements, a conventional helical spring and said plurality of annuli. On account of the different compression rates of each of these elements the member may provide a first comparatively high recovery force and at least one subsequent step in recovery of gradually decreasing force.

One embodiment of the invention will now be described, by way of example, with reference to the accompanying drawings of which:

Figure 1:
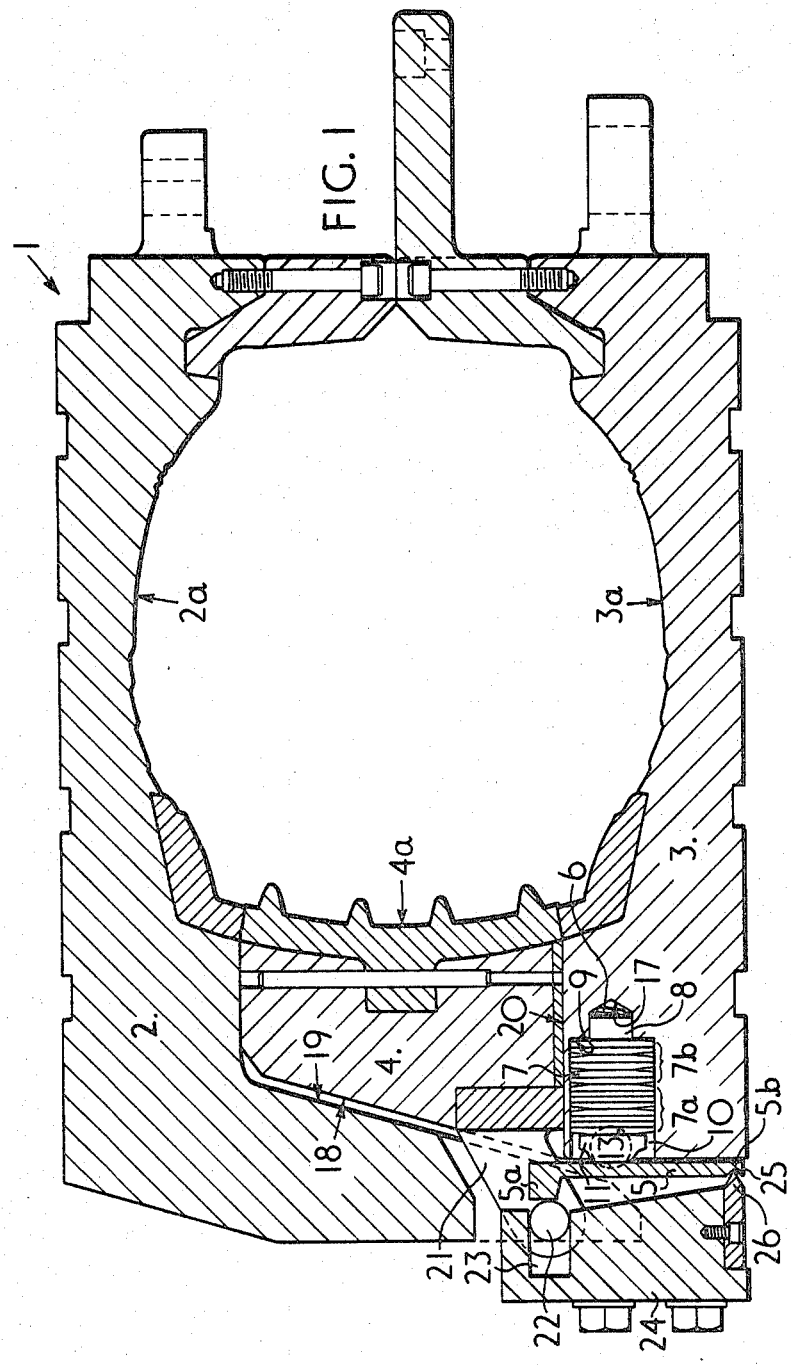
FIG. 1 shows a part scrap view, part cross-section through part of a tire mould according to the invention.

The mould 1 for a pneumatic tire shown in part in FIG. 1 comprises a steel upper mould half 2 and a steel lower mould half 3 each having a bead- and sidewall-moulding face 2a and 3a respectively and eight thread moulding segments 4 each having a tread moulding surface 4a, the segments being slidably movable radially of the lower mould half on surfaces 20 formed thereon.

The segments are each provided with a radially outwardly extending lug 21 on which is formed a spigot 22. This spigot is a sliding fit in an open-ended slot 23 formed in a bracket 24 secured to the base (not shown) for the mould 1 radially outwardly of the lower mould half 3. The segment is thus able to be slidably moved radially outwardly and titlted upwardly with respect to the lower mould half 3 by pivoting on the spigot 22 in the slot 23 thus allowing a tire (not shown) to be removed from the mould 1 after moulding.

Figure 2:
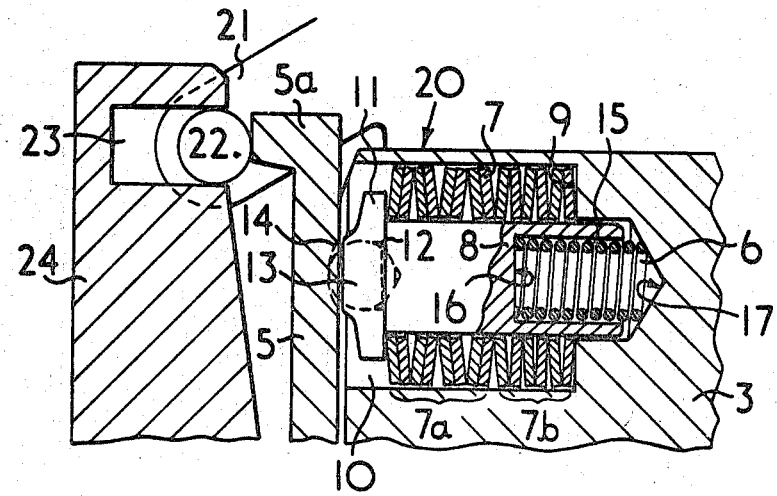
FIG. 2 shows a cross-section through the mould spring member on an enlarged scale to that shown in FIG. 1.

Each segment is provided with a segment moving lever 5, the upper end 5a of which bears on the spigot 22 of the segment lug 21. At the lower end 5b of the lever a V-groove 25 is formed enabling the lever to pivot on a knife edge 26 secured to the bracket 24. Bearing indirectly upon the lever 5 is a single compression spring 6 supplemented by a coaxial assembly 7 of dished annuli (shown in detail in FIG. 2) mounted upon a guiding pin 8. The dished annuli are located between the surface of a shoulder 9 formed in a hole 10 in the lower mould half 3 and the flanged head 11 of the guiding pin 8, the head 11 of the guiding pin being formed with a recess 12 in which is located a substantially spherical ball bearing 13 which bears upon a recessed portion 14 of the lever 5 for transmitting the spring force to the segment 4. The dished annuli are arranged in groups each containing an even number of annuli, one set 7a of two of the groups being arranged so that in each of the two groups there are two pairs of nesting annuli each pair opposed one to the other so that the inclination of the dished walls of one pair is in an opposite sense to the dished walls of the other pair. A second set 7b of three groups making five in all, are provided, each group being made up from dished annuli similarly arranged to those in the first group except that single opposed annuli are used instead of pairs. The whole set of annuli are arranged in series.

The helically coiled compression spring 6 is located in a counter bore 15 at the end of the headed guiding pin 8 upon which the annuli 7 are located, one end of the coiled compression spring 6 abutting the end 16 of the counter bore 15 in the pin 8 and the other end of the coiled compression spring abutting the base 17 of the hole 10 provided in the lower mould half within which the headed pin is also located. The effect of this arrangement is that the annuli assembly 7 and the coiled compression spring 6 operate so that the force applied on the segment by the fully compressed coils is 142 pounds force per segment and the force applied to the segment by the fully compressed annuli together with the fully compressed coil spring is 7,040 pounds force per segment.

Substantially frusto-conical surfaces 18 and 19 are provided both on the segments 4 and on the upper mould half 2 respectively, which surfaces co-operate as the upper mould half 2 is lowered onto the segments 4 so as to force the segments radially inwardly against the compression springs 6 and the annuli assembly 7 so as fully to close the mould 1.

In operation of the invention just described, when a pneumatic tire has been moulded within the mould 1 the mould closing force is removed and the upper mould half 2 moved apart from the lower mould half 3 so as to cause relative sliding movement between the substantially frusto-conical surfaces 18 and 19 and to allow each of the eight segments 4 to be moved radially outwardly with respect to the mould axis, each segment separately under the action of the compressed spring member acting through its associated segment moving lever 5.

Since the compression rate of the annuli assembly 7 is higher than that of the spring 6 the initial force causing radially outward movement to break the adhesion of the tire with the moulding surfaces 4a of the tread segments 4 is 7,040 pounds for each segment, this force gradually reducing as the upper mould half 2 is moved clear of the lower mould half 3 until, when the segment 4 is moved radially outwardly by $\frac{3}{32}$ of an inch from its fully closed position the force is reduced to 4,050 pounds, this force being applied to the segment to withdraw the complex tread moulding matrix from the moulded rubber of the tread. When the segment has moved a distance of $\frac{1}{2}$ an inch from its fully closed position substantially the whole of the annuli compression is removed whereupon the partially decompressed coiled compression spring 6 alone becomes effective and applies a force of about 67 pounds to the segment sufficient to move the segment fully clear of the moulded tread. For final removal of the tire the segments may be tilted radially outwardly.

It will be appreciated that all of this action apart from the final tilting, takes place automatically on removal of the top mould half 2 from the bottom mould half 3, the breaking of rubber adhesion and the withdrawal of the complex moulding matrix from the moulded tread being brought about by the spring members acting upon the levers 5 associated with the tread moulding segments 4.

It will also be appreciated that the force applied to the segment in a radially outwards direction by the spring member arrangement just described is not directly proportional to the radial distance of the segment from its position when the mould is completely closed, it being deliberately arranged that the initial force is very high over a relatively short radial distance. The desired value of this force and the distance over which it acts depends on the particular tire being moulded. It is possible to vary this value and the force/distance relationship by modifying the number and/or arrangement of the dished annuli assembly 7 just described.

Figure 3:
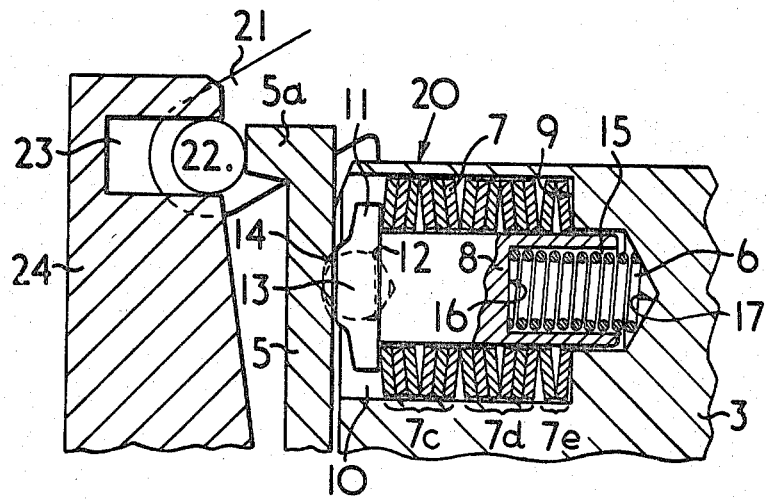
FIG. 3 shows a view similar to that in FIG. 2 of an alternative spring member construction.

For example, when the tire being moulded has a tread which is moulded by a complex bulbous-ended form of moulding matrix e.g. as decribed in my co-pending patent application No. 591,322 of Nov. 1, 1966, the initial force required to withdraw such a matrix from the tread rubber is particularly great since the bulbous end has to be withdrawn through a moulded neck of rubber. The fourteen annuli per segment in this modified arrangement shown in FIG. 3 are arranged in three sets 7c, 7d and 7e, the first two sets 7c and 7d of which each contain six annuli, a group of three of which are in nesting arrangement and are opposed to another group of three also in nesting arrangement so that the inclination of the dished walls of the annuli of the first group is in an opposite sense to the dished walls of the annuli of the second group. The third set 7e contains two annuli only, one opposed to the other. All the annuli are arranged in series on the guilding pin 8 in a similar manner to those described before.

The operation of this modified arrangement is substantially the same as that described before but in this instance the initial force applied to each segment is 10,500 pounds force, and the force applied when the segment is $\frac{3}{32}$ of an inch from its fully closed position is 5,750 pounds force i.e. considerably higher than for the unmodified arrangement.

In both of the spring member constructions just described the annuli are of steel and the walls have an inclination of about 5° in the uncompressed state of the annuli. However, it is possible to use other materials and/or other angles, depending on whether or not the particular material used is capable of withstanding the stress imposed on flattening the annuli.

The constructions just described are very compact, simple and automatic showing considerable advantages over, for example, pneumatic or hydraulic piston and cylinder devices for carrying out the same duty.

The operation of the present invention is facilitated by the utilisation of "Fluorosint" surfaces upon the tread segments as described in my co-pending patent application No. 772,949 of Nov. 4, 1968.

Having now described my invention, what I claim is:

1. A pneumatic tire mould comprising two mould halves in co-axial relationship each having sidewall- and bead-moulding portions, a plurality of tread moulding segments pivotally mounted on one of the mould halves so as to be disposed relatively to one another between the sidewall- and bead-moulding portions circumferentially of the mould in the form of an annulus and spring members operatively engageable one with each of the segments to move the segments substantially radially apart, each of said spring members comprising a plurality of co-axially arranged dished annuli compressible to tend to flatten the form of the annuli and to provide a spring force sufficient to break the adhesion of the tire tread rubber with the moulding segment.

2. A mould according to claim 1 wherein each spring member comprises a headed guiding pin on which the dished annuli are disposed in co-axial relationship therewith, the annuli being compressible between the head of the guiding pin and that mould half on which the segments are pivotally mounted.

3. A mould as claimed in claim 1 wherein the spring member comprises a helical spring of a compression rate different from that of the plurality of annuli, said member providing a first, comparatively high, recovery force and at least one subsequent step in recovery of gradually decreasing force.

4. A mould according to claim 3 wherein each spring member comprises a headed guiding pin formed with a counter bore, the dished annuli being disposed on the pin in co-axial relationship therewith, and being compressible between the head of the pin and that mould half on which the segments are pivotally mounted, the helical spring being disposed co-axially with the annuli in the counter bore and being compressible between the base of the counter bore and that mould half on which the segments are pivotally mounted.

5. A mould as claimed in claim 4 having a plurality of holes formed in that mould half on which the segments are pivotally mounted, one hole associated with each segment, each hole having a substantially circular cross-section and a longitudinal axis extending substantially radially of the mould, a shoulder being formed in each hole at the junction of a radially outer portion thereof of enlarged cross-section with the inner remaining portion thereof, the said guiding pin being located co-axially within the hole, the dished annuli being located in the said radially outer portion of the hole and being compressible between the head of the pin and the said shoulder portion, and the helical spring being compressible between the base of the hole and the base of the counter bore.

6. A mould according to claim 2 wherein a recess is formed in the head of each guiding pin, said mould comprising a plurality of segment closing levers, one lever associated with each segment and operable to cause radially outward movement of that segment, and a plurality of substantially spherical balls, one ball being located in each recess in engagement with the associated lever.

7. A mould as claimed in claim 1 wherein at least two of the dished annuli in each member are arranged in nesting relationship.

8. A mould as claimed in claim 1 wherein at least three of the dished annuli in each member are arranged in nesting relationship.

9. A mould as claimed in claim 1 wherein the plurality of annuli are arranged in groups, each group containing an even number of annuli, one half of the number in the group being in opposed relationship to the other half.

10. A mould according to claim 1 wherein each dished annulus has an inclination of about 5°.

References Cited

UNITED STATES PATENTS

| | | | |
|---|---|---|---|
| 3,082,480 | 3/1963 | Balle | 18—42 |
| 3,460,197 | 8/1969 | Cantarutti et al. | 18—42X |

FOREIGN PATENTS 1,437,222   3/1966   France.

WILLIAM S. LAWSON, Primary Examiner